Jan. 12, 1926.　　　　　　　　　　　　　　1,569,782
A. J. OTTO ET AL
MOUNT FOR THERMOSTATS
Filed July 8, 1925　　　2 Sheets-Sheet 1
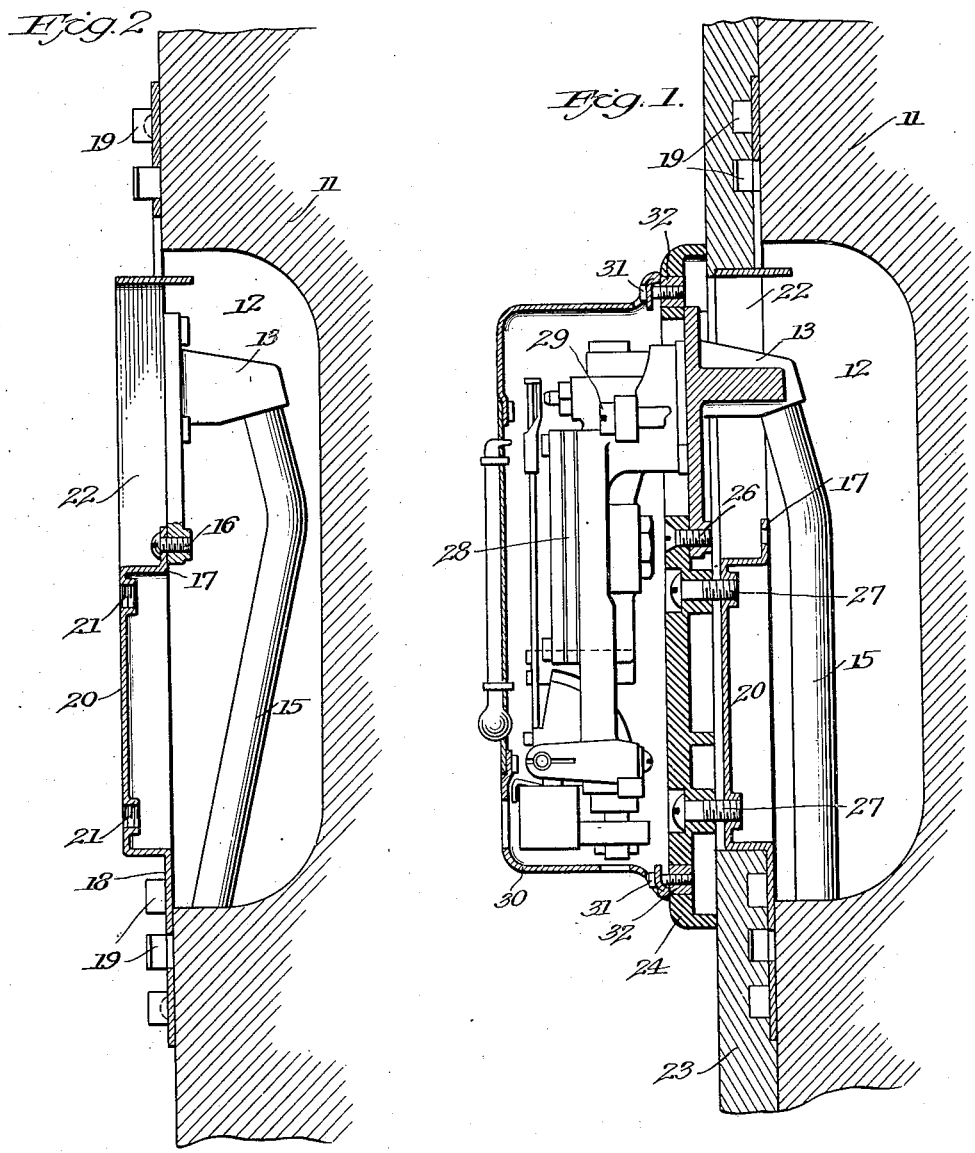
Inventor
Arthur J. Otto
Carl A. Otto
by Dodge
Attorney Jan. 12, 1926.    1,569,782
A. J. OTTO ET AL
MOUNT FOR THERMOSTATS
Filed July 8, 1925    2 Sheets-Sheet 2
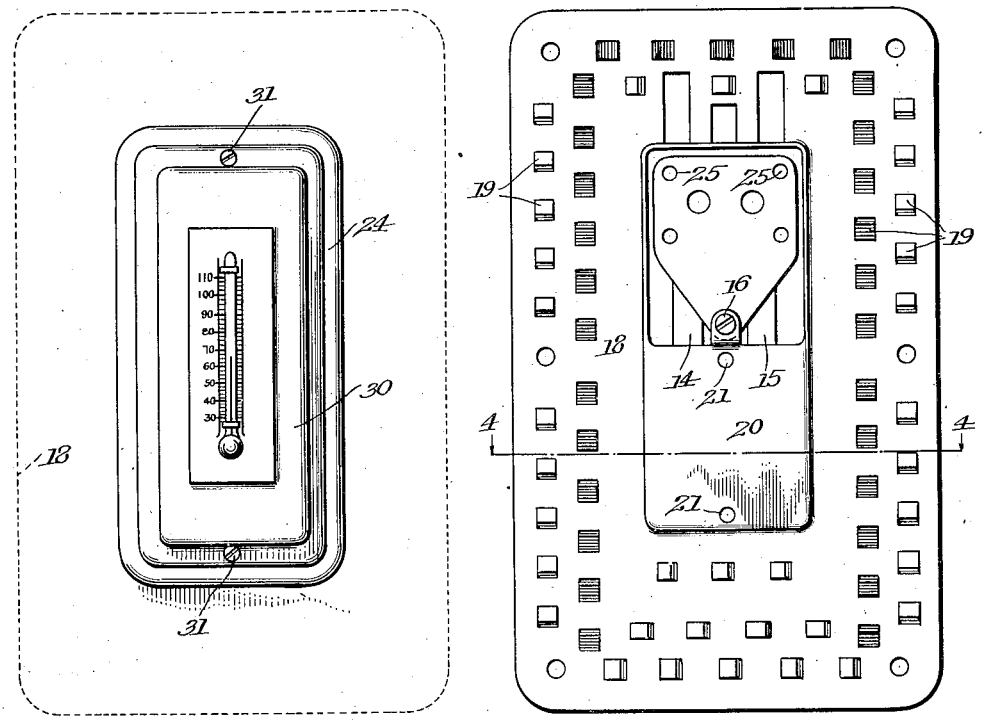
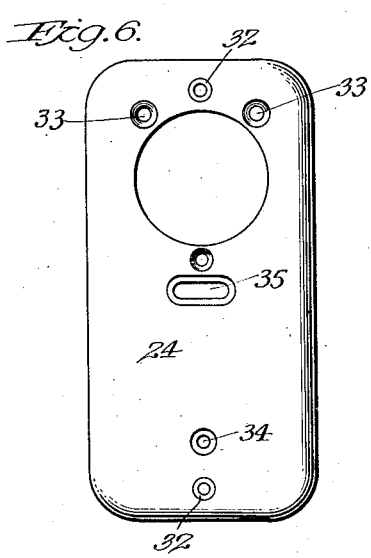
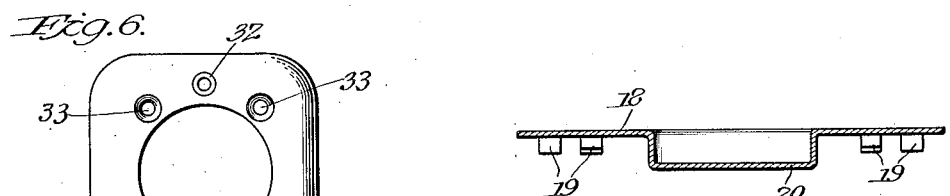
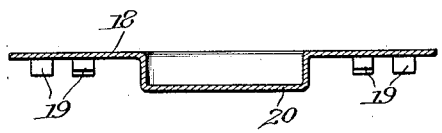
Inventor
Arthur J. Otto
Carl A. Otto
by Dodge & Sons
Attorneys Patented Jan. 12, 1926.

1,569,782

UNITED STATES PATENT OFFICE.

ARTHUR J. OTTO AND CARL A. OTTO, OF MILWAUKEE, WISCONSIN, ASSIGNORS TO JOHNSON SERVICE COMPANY, OF MILWAUKEE, WISCONSIN, A CORPORATION OF WISCONSIN.

MOUNT FOR THERMOSTATS.

Application filed July 8, 1925. Serial No. 42,333.

*To all whom it may concern:*

Be it known that we, ARTHUR J. OTTO and CARL A. OTTO, citizens of the United States, residing at Milwaukee, in the county of Milwaukee and State of Wisconsin, have invented certain new and useful Improvements in Mounts for Thermostats, of which the following is a specification.

This invention relates to thermostatic, hygrostatic, and similar control devices intended to be mounted on a wall and provides a convenient and stable means for supporting the piping before connection to the device and before the wall is finished, and for supporting both the instrument and the piping in proper to the wall after finishing of the latter.

The invention permits the following procedure during the construction of a building. A connection manifold known as a "pipe head" is mounted in a recess in the rough wall, which recess is made somewhat larger than is necessary to receive the pipe head. The pipe head is permanently connected by flexible metallic tubing to the usual motive fluid supply pipe and to the pipe or pipes leading to the devices to be controlled. After the pipe head has been connected as described, it is temporarily attached to a lug on a mount plate and this mount plate is permanently fastened by nails, screws or the like to the face of the unfinished wall where it will later be concealed by the plaster. The mount plate is formed with an aperture through which the pipe head may be drawn and is preferably formed with a boss below this aperture projecting nearly to the intended surface plane of the finished plaster.

Adjacent the aperture in the mount plate is the lug to which the pipe head is temporarily attached, and this lug is so positioned as to hold the pipe head retracted into the recess in the wall so that it is entirely out of the way during the plastering operation and unlikely, therefore, to be damaged. The plaster is brought to the margin of the aperture, and after the plastering has been finished, the pipe head is released from the mount plate and is drawn forward through the aperture. It is then attached to a base plate which in turn is connected to the forwardly projecting boss of the mount plate by means of screws or the equivalent. In this way the base plate seats on the finished wall smoothly around the aperature without imposing close limits on the thickness of the plaster coat. The thermostat is then clamped to the pipe head, making connection therewith in the usual manner, after which a protecting cover is attached to the base plate.

The preferred embodiment of the invention is illustrated in the accompanying drawings, in which—

Fig. 1 is a vertical section on a plane perpendicular to the wall showing the thermostat and its accessory parts all mounted in place;

Fig. 2 is a similar section showing the appearance of the parts before plastering when the mount plate has been connected to the pipe head and fixed in position on the wall;

Fig. 3 is a face view of the mount plate connected with the pipe head as shown in Fig. 2;

Fig. 4 is a section on the line 4—4 of Fig. 3;

Fig. 5 is an elevation showing the thermostat with its cover in place and indicating in dotted lines the position of the mount plate;

Fig. 6 is a front elevation of the base plate.

The rough wall (or partition) is indicated generally at 11 and a recess 12 is formed therein to receive the pipe head 13. Such pipe heads are known and have ported faces which mate with corresponding ported faces on the thermostat attached thereto. The pipe head 13 is connected by flexible metallic tubing 14 and 15 with a pressure fluid supply pipe and with a pipe leading to the device to be controlled. These pipes are not shown. The controlled device might, for example, be a diaphragm motor connected to a radiator valve in the room. After the head 13 has been connected by the tubing 14 and 15 as just described, it is connected by means of a screw 16 with a lug 17 formed on a mount plate 18. This plate is of generally rectangular form and is provided on the marginal portions of its front face with projecting tongues 19 struck out forwardly from the plate and intended to key the plaster. The mount plate is also provided with a forwardly projecting boss 20 in which are the tapped holes 21 which receive screws to retain the base hereafter described. Above the boss 20 there is an opening through the mount plate 18 and this is surrounded by a flange 22 which projects forward from the mount plate and terminates flush with the front face of the boss 20.

The parts are now in the condition shown in Fig. 2, so that the pipe head is thoroughly protected from injury during the plastering. The plaster 23 is applied so that it is flush with or projects slightly beyond the front face of the boss 20 and flange 22. When the plastering has been completed and the thermostat is to be installed, the screw 16 is withdrawn, and the pipe head 13 is tilted to the rear to clear the lug 17. The pipe head 13 is then drawn forward through the opening in the mount plate, and connected with a base 24 preferably molded of some suitable composition. This connection is made by three screws, two of which pass through the holes 33 (Fig. 6) and are threaded into the holes 25 (see Fig. 3). The third screw is shown at 26 in Fig. 1.

The pipe head having been connected to the base 24, the base is then attached to the mount plate 18 by means of the screws 27 (see Fig. 1) which pass through the hole 34 and slot 35 in the base 24 and engage the threaded openings 21 in the mount plate 18. The slot allows the base to be vertically aligned and when the base is fixed the pipe head is rigidly held in proper relation thereto. The thermostatic device, indicated generally by the numeral 28, is now connected to the pipe head 13 by means of screws, one of which is shown at 29 in Fig. 1. A cover 30 is then mounted on the base 24 by means of screws 31 which are threaded into bushings 32 molded in the base.

It will be observed that the base is carried by the mount plate and that the screws permit the base to be aligned and also to be fixed tightly at its margin against the face of the plaster regardless of slight errors in location of the mount plate and without imposing close limits on the thickness of the plaster over the mount plate. In the finished condition the pipe head carries the thermostat, and is in turn carried by the base, so that the relation of the thermostat to the base must be correct.

The ease of mounting and the fact that the thickness of the plaster is compensated for are important practical considerations.

What is claimed is:

1. In a mounting for control instruments, the combination of a movable pipe head; a mount adapted to be fixed in a wall, and having an aperture through which said pipe head may be moved; a base releasably supported on said mount; means for connecting said pipe head to said mount at the rear thereof when said pipe head is retracted; and means for connecting said pipe head to said base when the latter is drawn forward through said aperture.

2. The combination with a controlling device including a pipe head, a thermostat mechanism and means for connecting said mechanism releasably to said head, of a plate adapted to be mounted in a wall structure, said plate having means for retaining said head in an abnormal position in said wall when disconnected from said thermostat mechanism; a base mounted on said plate; and releasable connections between said base and plate and between said base and pipe head.

3. Mounting means for control devices which include a ported pipe head and a control mechanism releasably connected therewith, comprising in combination, a mount plate arranged to be fixed in a wall and having an aperture through which said pipe head may be passed and means for temporarily sustaining said pipe head to the rear of said plate while disconnected from said control device; a base member; and means for connecting said base member to the front of said mount plate and to said pipe head when the latter is drawn through said aperture.

4. Mounting means for control devices which include a ported pipe head and a control mechanism releasably connected therewith, comprising in combination a mount plate arranged to be fixed in a wall beneath the plaster thereof and having a forward projection approximately the thickness of the plaster forming a boss and an adjacent aperture, said plate carrying adjacent said aperture means for temporarily retaining said pipe head in a position to the rear of said aperture; a base overlying said boss and aperture; and means for connecting said base to said boss and to said pipe head when drawn through said aperture.

5. Mounting means for control devices which include a ported pipe head and a control mechanism releasably connected therewith, comprising in combination a mount plate arranged to be fixed in a wall beneath the plaster thereof and having a forward projection approximately the thickness of the plaster forming a boss and an adjacent aperture; a base overlying said boss and aperture; and means for connecting said base to said boss and to said pipe head when drawn through said aperture.

6. Mounting means for control devices of the type including a pipe head and a control mechanism releasably connected thereto, comprising in combination a molded base; means for supporting said pipe head and control device on said base; a cover; means for attaching said cover to said base; and adjustable means for fixing said base in aligned relation with the surface of a wall.

7. Mounting means for control devices of the type including a pipe head and a control mechanism releasably connected thereto, comprising in combination a molded base; means for supporting said pipe head and control device on said base; a cover; means for attaching said cover to said base; and adjustable means including threaded connections passing through openings in the base at least one of which is elongated, to retain the base seated against the face of a wall and permit adjustment angularly.

In testimony whereof we have signed our names to this specification.

ARTHUR J. OTTO.
CARL A. OTTO.